United States Patent [19]

Iwata et al.

[11] Patent Number: 5,788,225

[45] Date of Patent: Aug. 4, 1998

[54] BASE AND FIXTURE TO BE USED IN MACHINING OPERATION

[75] Inventors: Kazuhide Iwata; Toshiya Sato, both of Gifu, Japan

[73] Assignee: Kabushiki Kaisha Imao Corporation, Gifu, Japan

[21] Appl. No.: 818,385

[22] Filed: Mar. 14, 1997

Related U.S. Application Data

[63] Continuation of Ser. No. 543,508, Oct. 16, 1995, abandoned.

[30] Foreign Application Priority Data

Oct. 21, 1994 [JP] Japan ................... 6-282977

[51] Int. Cl.⁶ .................................................. B23Q 1/08
[52] U.S. Cl. ........................................ 269/309; 269/900
[58] Field of Search ............................ 269/37, 41, 53, 269/54.1, 54.4, 54.5, 289 R, 292, 296, 309, 900

[56] References Cited

U.S. PATENT DOCUMENTS

| | | | |
|---|---|---|---|
| 3,518,743 | 7/1970 | Muller | 269/309 |
| 4,585,217 | 4/1986 | Erickson | 269/900 |
| 4,610,020 | 9/1986 | La Fiandra | 269/309 |
| 4,630,811 | 12/1986 | Rudisill | 269/900 |
| 4,738,439 | 4/1988 | Satake . | |
| 4,828,240 | 5/1989 | Longenecker et al. | 269/900 |
| 4,834,358 | 5/1989 | Okolischan et al. | 269/309 |
| 4,934,680 | 6/1990 | Schneider | 269/309 |
| 5,036,579 | 8/1991 | Buchler | 269/309 |
| 5,065,991 | 11/1991 | Schneider | 269/309 |
| 5,190,272 | 3/1993 | Zika et al. . | |
| 5,190,273 | 3/1993 | Salvagnini . | |
| 5,195,227 | 3/1993 | Wickham | 269/309 |
| 5,275,326 | 1/1994 | Fielder | 269/900 |
| 5,415,384 | 5/1995 | Obrist et al. | 269/309 |
| 5,487,539 | 1/1996 | Obrist | 269/309 |

FOREIGN PATENT DOCUMENTS

| | | |
|---|---|---|
| 2523492 | 9/1983 | France . |
| 62-28367 | 7/1987 | Japan . |
| 62-259727 | 11/1987 | Japan . |
| 1034627 | 2/1989 | Japan . |
| 4289045 | 10/1992 | Japan . |

*Primary Examiner*—Robert C. Watson
*Attorney, Agent, or Firm*—Morrison Law Firm

[57] ABSTRACT

A machining device has a base and a fixture. The base is fixedly attached to a pallet or a machining table. The fixture is mounted on the base, contacting the base only at projecting contact surfaces which project above the mounting surface of the base. Cleaning of the base before a fixture is attached is done efficiently because only the minimized projecting contact surfaces area between the base and the fixture needs to be cleaned to permit stable contact between the base and fixture. The base and fixture also include projections and holes for precisely aligning the base and fixture with respect to each other.

14 Claims, 9 Drawing Sheets

BASE AND FIXTURE TO BE USED IN MACHINING OPERATION

This application is a continuation, of application Ser. No. 08,543,508, filed Oct. 16, 1995, now abandoned.

BACKGROUND OF THE INVENTION

The present invention relates to a base and a fixture to be used in machining operations.

In a conventional machining apparatus, a fixture, such as a plate, a two-sided block or a four-sided block, fixedly mounts onto a table or a pallet of a machining device (also referred to as a machining apparatus or a machine tool), to position and retain a workpiece. Conventional fixtures mount directly onto the mount surface of the table or the pallet of the machining apparatus. Therefore, any debris left on the mount surface from a prior machining operation must be carefully removed before the next fixture is attached to assure a stable connection. Cleaning the mount surface requires time and labor and reduces overall productivity.

Furthermore, fixtures require high precision positioning on the mount surface of the table of the machining apparatus. Such highly precise positioning of fixtures requires the time and skill of an experienced operator. Before each new fixture is attached to the base, the mount surface must be cleaned and the fixture must be carefully and precisely positioned, thereby reducing the efficiency of the entire machining operation. The present invention overcomes the above-stated problems of the conventional art.

OBJECT AND SUMMARY OF THE INVENTION

It is an object of the present invention to provide a base and a fixture that overcome the problems of the prior art.

It is an object of the invention to provide a base and a fixture that, when used together, reduce the time and labor required to remove debris produced during the previous machining operation.

It is another object of the invention to provide a base and a fixture which facilitate high-precision positioning of the fixture by an ordinary operator performs the positioning operation, thereby improving the efficiency in fixing a fixture to a table or a pallet of a machining device, a machining apparatus or a machine tool.

Briefly, a machining device has a base and a fixture. The base is fixedly attached to a pallet or a machining table. The fixture is mounted on the base, contacting the base only at projecting contact surfaces which project above the mounting surface of the base. Cleaning of the base before a fixture is attached is done efficiently because only the minimized projecting contact surfaces area between the base and the fixture needs to be cleaned to assure stable contact between the base and fixture. The base and fixture also include projections and holes for precisely aligning the base and fixture with respect to each other.

According to an embodiment of the present invention, there is described a machining device comprising: a base having a mounting surface, a means for holding a workpiece having a bottom surface, means for fixedly attaching said means for holding a workpiece to said base, said mounting surface having discrete first contact surfaces, and said bottom surface contacting said base only at said first contact surfaces when said means for holding a workpiece is fixedly attached to said base, such that the total contact area is less than the area of each of the bottom surface and the mounting surface.

The fixture, such as a plate, a two-sided block or a four-sided block, which serves as the means for holding a workpiece, contacts and is supported by the projecting contact surfaces (first contact surfaces) provided on the mount surface of the base. After cleaning the projecting contact surface of the base and the bottom surface of the fixture, stable and proper contact between them can be achieved because the contact area between the base and fixture is free from intervention of cutting chips or other debris left on the projected contact surface by the previous machining operation. The fixture is therefore firmly connected to the base. In addition, because the contacting surfaces of the mount surface of the base is substantially reduced, the labor required for cleaning of cutting chips or the like is significantly reduced, and the efficiency in mounting the fixture to the base is improved.

When the fixture is mounted on the mount surface of the base so that the tapered pit provided in the bottom surface of the fixture fits over the tapered projection of the base, the tapered surfaces of the tapered pit and the tapered projection abut each other to precisely position the fixture relative to the base. Once the base is precisely positioned and fixed to the table or the pallet of a machining apparatus (or a machine tool), no further troublesome positioning operation between the fixture and the base is needed. In addition, the precise positioning of the fixture to the base can be performed even by an ordinary operator. Therefore, the efficiency in mounting the fixture is further improved.

The tapered projection is formed separately from the base body of the base and is fixedly attached to the base body.

If the tapered projection is a separate member, production of a structure comprising the base body and the tapered projection is facilitated without a complicated production operation. Where such a structure is formed by cutting and grinding one solid piece of material, the production is complicated.

A pit is bored in a top surface of the base body. A tapered pin is inserted and fixed into the pit so as to form the tapered projection.

A plate member may be attached to the base body for providing the projecting contact surface.

The projected contact surface may also be formed together with the base body which makes it easier to produce the entire base at a cheaper cost.

If the projecting contact surface is formed together with the base body, production costs are reduced compared with the construction where the projecting contact surface is formed separately from the base body. However the production of the base is more complicated if the projecting contact surface areas are formed together with the base body.

The tapered projection is located near the projected contact surface.

If the tapered projection and the projecting contact surface are close to each other, they can be easily cleaned together, and thus reduce the labor for cleaning, compared with a construction where the tapered projection is apart from the projecting contact surface.

The projecting contact surface on the mount surface of the base contacts a projecting contact surface on the bottom surface of the fixture.

If the projected contact surface of the fixture contacts the projected contact surface of the base, the fixture is supported on the base by abutment between both projected contact surfaces of the base and the fixture.

With this construction, stable and proper contact between both projecting contact surfaces of the base and the fixture can be achieved by being free from intervention of cutting chips or other debris after cleaning both projecting contact surfaces. The fixture is thus firmly fixed to the base. This construction also reduces the labor required for removing, from the both contact surfaces, cutting chips or the like left by the previous machining operation. In addition, because fixture and the base directly contact each other substantially only by both projecting contact surfaces, the area of both contacting surfaces of the base and fixture are substantially reduced, and the labor required for cleaning of cutting chips or other debris is significantly reduced, thus improving efficiency in mounting the fixture to the base. This reduced contact area requires precise cutting and grinding of the contact surfaces of the two members to achieve stable and proper contact therebetween.

According to another embodiment of the present invention, there is described, a base, having a mount surface, for fixedly attaching a means for holding a workpiece onto said mount surface, comprising:

a discrete first contact surfaces provided on said mount surface to contact a bottom surface of said means for holding a workpiece, and said first contact surface contacting said base only at said bottom surfaces when said means for holding a workpiece is fixedly attached to said base.

According to another embodiment of the present invention, there is described, a fixture for holding a workpiece, fixedly mountable on a base, comprising: a bottom surface contacting discrete first contact surfaces on a mount surface of said base, and said bottom surface contacting said base only at said first contact surfaces when said fixture is fixedly attached to said base.

The fixture, such as a plate, a two-sided block or a four-sided block, is supported on the base by abutment between the both projected contact surfaces provided on the bottom side of the fixture and the projected contact surface provided on the mount surface of the base.

With this construction, stable and proper contact between the fixture and the base can be achieved simply by cleaning the projected contact surfaces of the both members. The fixture can then be firmly fixed to the base. This construction also reduces the labor required for removing, from the contacting surfaces, cutting chips or other debris left by the previous machining operation. The efficiency in mounting the fixture to the base is thus improved.

When the fixture is mounted on the mount surface of the base so that the tapered pit of the fixture fits over the tapered projection of the base, the both taper surfaces of the tapered projection and the tapered pit abut each other to precisely position the fixture relative to the base. Therefore, precise positioning of the fixture can be performed even by an ordinary operator. The efficiency in mounting the fixture is thus further improved.

With the projecting contact surface provided on the fixture, when the fixture is fixed to the base, the fixture and the base directly contact each other substantially only by the projected contact surfaces of the both members. This reduced contact area requires precise cutting and grinding of the contact surfaces of the fixture and the base to achieve stable and proper contact therebetween, compared with a construction where the bottom surface of the fixture is not provided with projecting contact surfaces.

According to still another embodiment of the present invention, there is described, a machining device comprising a base having a mounting surface, a means for holding a workpiece having a bottom surface, means for fixedly attaching said means for holding a workpiece to said base, said mounting surface having discrete first contact surfaces, said bottom surface having discrete second contact surfaces corresponding to said first contact surfaces, said bottom surface contacting said base only where said first contact surfaces and said second contact surfaces meet when said means for holding a workpiece is fixedly attached to said base, said means for holding a workpiece including at least one separate mounting device, attachable to said means for holding a workpiece, and discrete third contact surfaces, and said at least one separate mounting device contacting said means for holding a workpiece only at said third contact surfaces.

The plate, which serves as the separate mounting device, is supported on the fixture body by abutment between the reverse side of the plate and the projecting contact surface (discrete third contact surface) provided on the mount surface of the fixture body. With this construction, stable and proper contact between the plate and the fixture body, free from intervention of cutting chips or other debris, can be achieved simply by cleaning the reverse side of the plate and the projected contact surface of the fixture body. The plate is thus firmly fixed to the fixture body. This construction also reduces the labor required for removing cutting chips or other debris left by the previous machining operation. The efficiency in connecting the plate to the fixture body is thus improved.

When the plate is connected to the mount surface of the fixture body so that the tapered pit provided in the reverse side of the plate fits over the tapered projection of the fixture body, the tapered surfaces of the tapered projection and the tapered pit abut each other to precisely position the plate relative to the fixture body. Therefore, precise positioning of the plate can be performed even by an ordinary operator. The efficiency in connecting the plate to the fixture body is thus improved.

A workpiece and jigs are fixed to the plate, which is set on a flat table or machining base, prior to mounting the plate to the fixture body. Such preparatory setup facilitates changing plate assemblies that include plates, jigs and workpieces, compared with the case where the jigs and a workpiece are fixed to the plate after the plate has been fixed to the fixture body. Thus, the efficiency in setting or replacing a plate assembly on the fixture body is improved.

DETAILED DESCRIPTION OF PREFERRED EMBODIMENTS

Figure 1:
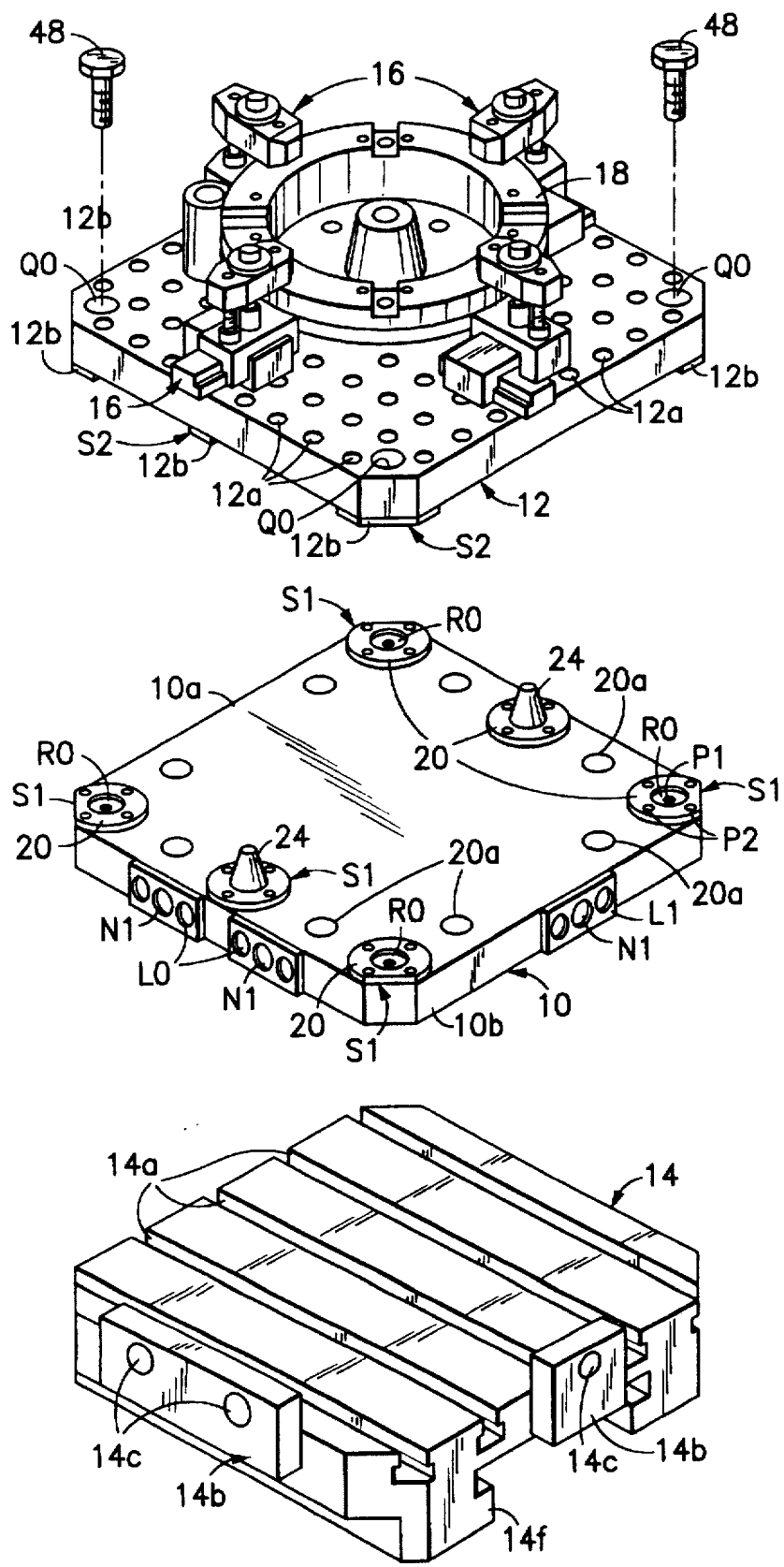
FIG. 1 is an exploded perspective view of a first embodiment of the base and the fixture to be fixed to the base of the present invention, also showing a pallet.

Referring to FIG. 1, a base 10 is used to affix a fixture 12 to a pallet 14 of a machining apparatus (or a machine tool). Fixture 12 shown in FIG. 1 is generally referred to as a plate. Any other type of fixture can also be used, such as a two-sided block or a four-sided block, and still be within the spirit and scope of the present invention. Fixture 12 includes a plurality of reference holes 12a that are arranged in the form of a matrix or grid with a predetermined interval for positioning and fastening various jigs 16 relative to base 10. Jigs 16 (for example, a positioning member, a fixing member, or a fastening member such as a clamp), mount on fixture 12 in reference holes 12a. Jigs 16 are any type of fixture element that can be used to hold or position a workpiece 18 on fixture 12. Workpiece 18 can thereby be precisely positioned and fixed at a predetermined position on fixture 12.

Reference holes 12a of fixture 12 may be equidistant from each other or the spacing in one direction may be different from the spacing in another direction. The spacing is not necessarily uniform in either direction. Also, a grid design is not the only pattern of reference holes 12a. Any pattern is satisfactory as long as various jigs 16 can be mounted where necessary on fixture 12.

In addition, fixture 12 is not necessarily limited to having reference holes 12a as shown in FIG. 1. For example, fixture 12 may instead have a plurality of parallel reference slots having a cross sectional shape of an inverted T (hereinafter called T-slots), which are spaced by a predetermined interval or at random intervals. Furthermore, a fixture without any reference holes or reference slots may also be used.

Pallet 14 includes a plurality of parallel T-slots 14a formed on its top. T-slots 14a extend along one direction from one edge of pallet 14 to another edge and receive corresponding T-slot nuts (not shown in FIG. 1). Base 10 fixedly attaches to pallet 14 by using T-slot nuts fitted into appropriate ones of T-slots 14a and by tightening bolts (not shown in FIG. 1) into the T-slot nuts to hold base 10 on pallet 14.

Two edge locators 14b are mounted on two adjacent sides of pallet 14 respectively. One of edge locators 14b is mounted at an end of T-slot 14a another edge locator 14b is mounted generally parallel to T-slots 14a. Edge locators 14b attach to pallet 14 at an upper portion of two adjacent sides of pallet 14. A portion of each edge locator 14b extends above the top surface of pallet 14. Edge locators 14b are used as position reference members to mount base 10 at a predetermined position on pallet 14.

Each edge locator 14b includes one or more holes 14c bored therethrough. When base 10 is mounted on pallet 14, bolts are respectively inserted in holes 14c and thread into screw holes N1 in the corresponding sides of base 10. Thus, base 10 can be firmly positioned with reference to the inner surfaces of edge locators 14b of pallet 14.

The sides of base 10 corresponding to edge locators 14b of pallet 14 have distance adjusting side plates L0 and L1, respectively. Distance adjusting side plates L0 and L1 abut corresponding edge locators 14b of pallet 14. A mount surface 10a of base 10 includes tapered projections 24 at various locations. The bottom surface of fixture 12 includes tapered pits 22 corresponding to tapered projections 24 of base 10. Distance adjusting side plates L0 and L1 are sized to achieve exact predetermined distances between the inner surfaces of edge locators 14b and tapered projections 24. According to this embodiment, distance adjusting side plates L0 and L1 screw onto the sides of base 10. Thus, exact predetermined distances between the inner surfaces of edge locators 14b and tapered projections 24 is achieved. Pallet 14 has a mount groove 14f on its bottom side for fixing pallet 14 to a table or a machining apparatus (or a machine tool).

Figure 2:
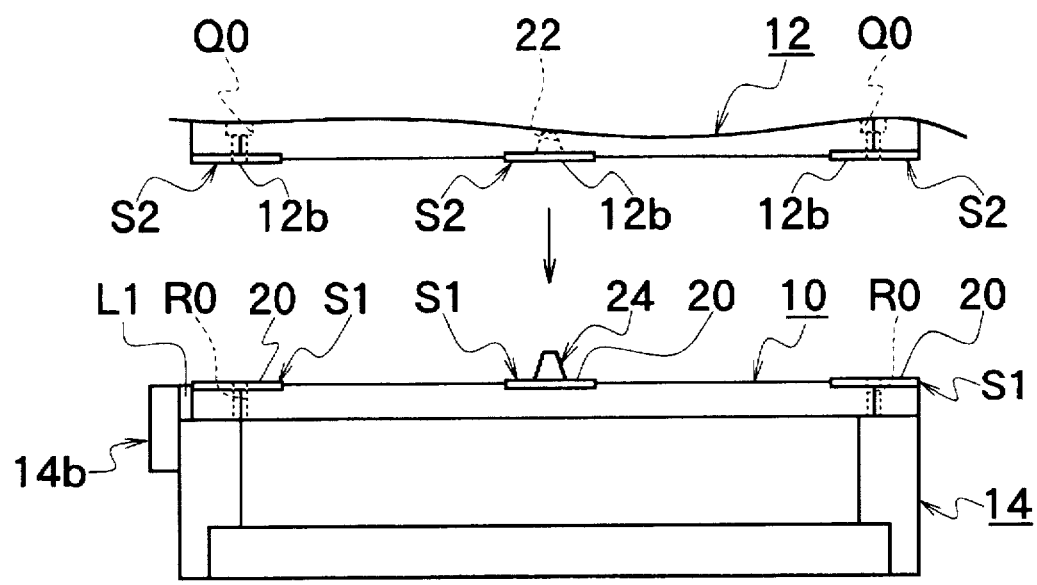
FIG. 2 is a side view of the base and the fixture, illustrating that the base and the fixture are mounted on the pallet.
Figure 3:
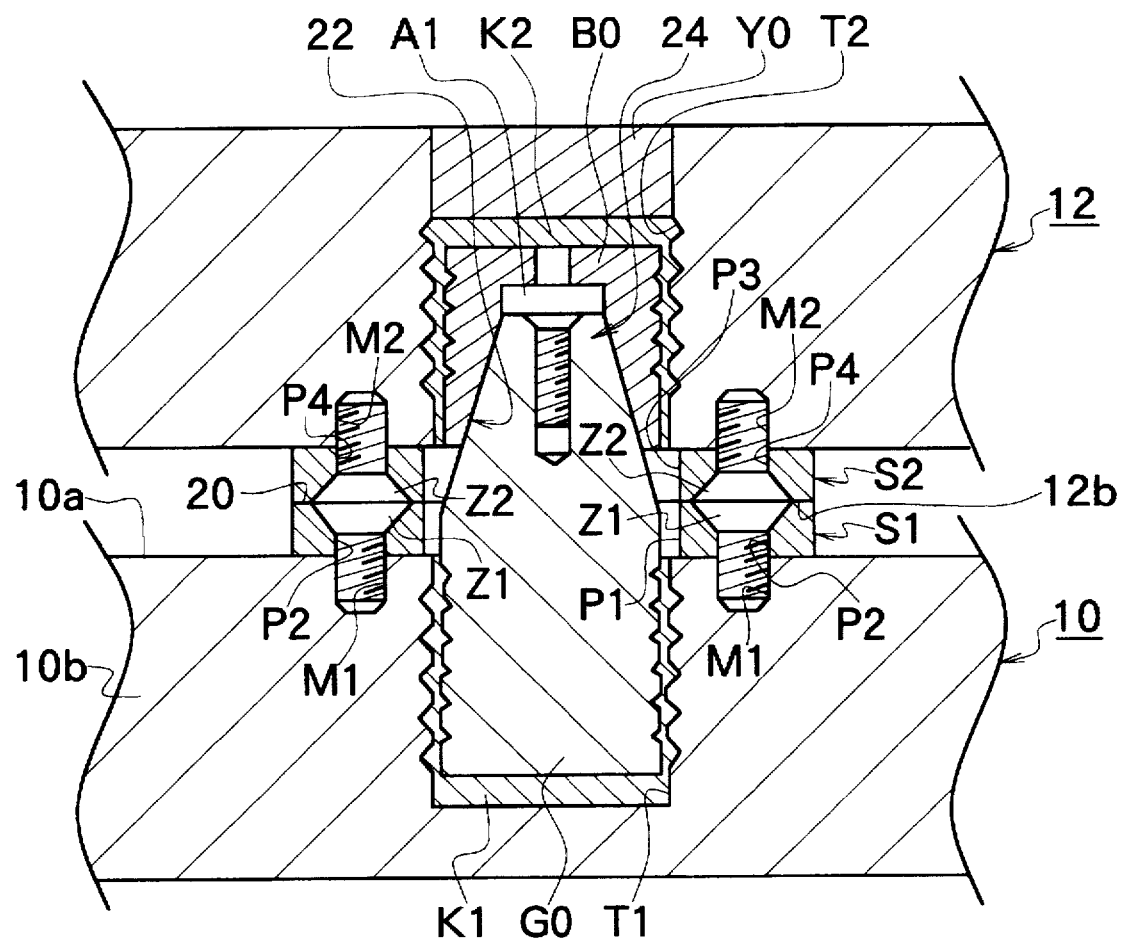
FIG. 3 is a sectional view of the base and the fixture fitted together by abutment between a tapered surface of a tapered projection on the base and a tapered surface of a tapered pit on the fixture.

Base 10 has projecting contact surfaces 20 projecting from a mount surface 10a of base 10, as shown in FIGS. 1–3. Fixture 12 also has projecting contact surfaces 12b projecting from the bottom surface of fixture 12. Projecting contact surfaces 12b abut projecting contact surfaces 20 of base 10. Tapered projections 24 (see FIGS. 2 and 3) that fit in tapered pits 22 respectively provided on the bottom surface of fixture 12 when fixture 12 is mounted on base 10. Each tapered projection 24 has a sectionally tapered shape and becomes narrower toward its free end. Each tapered pit 22 also has a sectionally tapered shape and becomes narrower toward its inside end. Tapered projections 24, projecting contact surfaces 20, and base 10 are separate members that have been individually formed and then assembled as shown in FIG. 3.

An example showing the separate members is as follows: Base 10 includes a base body 10b having a plate-like shape, plate members S1 mount on base body 10b further include projected contact surfaces 20. Plate members S1 further include holes P1 extending through plate members S1 in the direction of the height of plate member S1 from mount surface 10a of base 10.

Plate member S1 also includes a plurality of mounting holes P2 (four mounting holes according to this embodiment as shown in FIG. 1) that surround hole P1 respectively. FIG. 1 shows that base body 10b carries six plate members S1. Four plate members S1 are located at the corners, and two other plate members S1 are located in the middle of both side portions. However, the number and arrangement of plate members S1 may be changed according to operational requirements. Base 10 may also be used without projecting contact surfaces 20 which are included on plate members S1, if fixture 12 can be properly placed on base 10 in any other manner.

Referring now to FIG. 3, base body 10b includes pits T1 on mount surface 10a. Pits T1 house tapered projections 24, corresponding to mount positions of holes P1 of plate members S1. Pits T1 are formed in the mount positions for plate members S1 generally in the middle of both side portions of base body 10b. Each pit T1 is surrounded by a plurality (four in FIG. 1) of female screw holes M1. Female screw holes M1 are best shown in FIG. 3. Each pit T1 concentrically aligns with hole P1 of plate member S1 when plate member S1 is mounted on base body 10b. Each female screw hole M1 concentrically aligns with a corresponding mounting hole P2 of plate members S1 respectively. Plate members S1 are held onto base body 10b by screwing flush screws Z1 into female screw holes M1 through respective mount holes P2. Projecting contact surfaces 20 corresponding to pits T1 are therefore fixed to base body 10b.

A tapered pin G0 forms a tapered projection 24 when inserted into pit T1. Tapered pin G0 inserts through hole P1 of plate member S1. An adhesive K1 applied to the inner surfaces of pit T1 fixes tapered pin G0 to base body 10b. Alternatively, pits T1 may be inserted into base body 10b independent or apart from plate members S1.

Referring back to FIG. 1, four bolt-receiving bolt holes R0 are on the four corners of base body 10b. Four plate members S1 are mounted on base body 10b, concentrically aligned with bolt holes R0 respectively. Bolt holes R0 also correspond to bolt insert holes Q0 on four corners of fixture 12 respectively. Fixture 12 is fixed to base body 10b by inserting fastening bolts 48 through bolt insert holes Q0 respectively and threading the bolts through bolt holes R0.

Each bolt hole R0 opens on mount surface 10a of base body 10b. Each bolt hole R0 is surrounded by four female screw holes for mounting plate member S1 similar to screw holes M1 (shown in FIG. 3). The four female screw holes also have openings on the top of base body 10b. As described above, plate members S1 are fixed to base body 10b by screwing flush screws similar to flush screws Z1 into screw holes through mount holes P2 of plate members S1. Projecting contact surfaces 20 corresponding to bolt holes R0 are thus provided on base body 10b.

Base body 10b, tapered projections 24 and projecting contact surfaces 20 are separate parts according to this embodiment because a separate-part assembly method is easier than cutting and grinding the resultant shape from one solid piece of material.

Tapered projections 24 are adjacent to projecting contact surfaces 20 on mount surface 10a according to this embodiment. Tapered projections 24 and projecting contact surfaces 20 can be easily cleaned simultaneously, thus reducing the labor required for cleaning a conventional base and fixture.

However, as stated above, tapered projections 24 may be mounted without projecting contact surfaces 20. In addition, tapered projections 24 and plate members S1 having projecting contact surfaces 20 may be formed as one piece. Furthermore, tapered projection 24 and/or projecting contact surface 20 may be constructed with base body 10b as one piece.

Base body 10b further includes a plurality of holes 20a that are formed between projecting contact surfaces 20. Holes 20a receive fastening bolts (not shown) to be fastened to the T-slot nuts that are inserted in appropriate T-slots 14a. Base 10 is affixed to the top of pallet 14 by bolts inserted holes 20a of base body 10b from above and fastened to the T-slot nuts held in T-slots 14a under base body 10b.

Projecting contact surfaces 12b abut corresponding projecting contact surfaces 20 of base 10. Therefore, when fixture 12 is affixed to base 10, fixture 12 and base 10 directly contact each other only by projecting contact surfaces 12b and 20. The small contact area between projecting contact surfaces 12b and 20 requires that projecting contact surfaces 12b and 20 be perfectly formed to achieve stable and proper contact between them.

Projected contact surfaces 20 and 12b also facilitate the cleaning operation required prior to mounting fixture 12 to base 10. The stable and proper contact between the two members free from intervention of cutting chips or other debris is achieved simply by cleaning projecting contact surfaces 20 and 12b. Fixture 12 is thus be firmly affixed to base 10. It is not necessary that projecting contact surface 12b and 20 both be present to achieve the desired results. Projecting contact surfaces 12b may be omitted from the bottom surface of fixture 12 (for example, an entirely flat bottom surface of fixture 12 may be employed). Because the debris from a previous machining operation will tend to fall onto base 10, only projecting contact surfaces 20 of base 10 need to be cleaned to achieve proper contact with fixture 12.

Fixture 12 has plate members S2 on its bottom, as shown in FIGS. 1–3. Plate members S2 have projecting contact surfaces 12b. Each plate member S2 has a hole P3 bored through plate member S2 in the direction of the height of plate member S2 from the bottom surface of fixture 12. Plate member S2 also includes a plurality of mount holes P4 (four mount holes according to this embodiment) that surround holes P3. Six of plate members S2 are mounted on fixture 12, at positions corresponding to six plate members S1 provided on base body 10b.

Fixture 12 includes pits T2 for housing tapered pits 22. Pits T2 correspond to the mounting positions for plate members S2. The mounting positions correspond to tapered projections 24 on base 10. Each pit T2 is surrounded by four screw holes M2.

Each pit T2 concentrically aligns with hole P3 of plate member S2 when plate member S2 is mounted. Screw holes M2 concentrically align with mount holes P4 of plate members S2. Plate members S2 are affixed to fixture 12 by inserting flush screws Z2 through mount holes P4 and threading flush screws Z2 into screw holes M2. Projecting contact surfaces 12b corresponding to pits T2 are on a bottom surface of fixture 12.

Taper bushes B0 for forming taper pits 22 insert into respective pits T2 through holes P3 of plate members S2. An adhesive K2 applied to the inner surfaces of pit T2 fixes taper bush to base body 10b. A lid Y0 closes the end of hole P3 to form pit T2.

Bolt insert holes Q0 concentrically align with holes P3 of plate members S2 and also with bolt holes R0 of base 10 when fixture 12 is attached to base 10. As described above, bolt insert holes Q0 receive the bolts (not shown) to affix fixture 12 to base 10.

Each bolt insert hole Q0 opens to the bottom surface of fixture 12. Each bolt insert hole Q0 is surrounded by a plurality of (four) screw holes for mounting plate member S2 similar to female screw holes M1 shown in FIG. 3. The screw holes also have openings in the bottom surface of fixture 12. As described above, plate members S2 are affixed to fixture 12 by inserting flush screws similar to flush screws Z2 through mount holes P4 of plate members S2 and threading the flush screws into the screw holes. Projecting contact surfaces 12b corresponding to bolt insert holes Q0 are on a bottom surface of fixture 12.

The fixture 12, tapered bushes B0, and projecting contact surfaces 12b are separate parts according to this embodiment because a separate-part assembly method is easier than cutting and grinding the resultant shape from one solid piece of material. Since tapered pits 22 are adjacent to projecting contact surfaces 12b according to this embodiment, tapered pits 22 and projecting contact surfaces 12b can be easily cleaned, thus reducing the labor required for cleaning the conventional fixture.

However, as stated above, tapered pits 22 may be connected apart from projecting contact surfaces 12b. In addition, tapered pit 22 and projecting contact surface 12b may be formed as one piece. Furthermore, tapered pit 22 and/or a projecting contact surface 12b may be constructed with fixture 12 as one body.

When fixture 12 is mounted on mount surface 10a of base 10, tapered projections 24 of base 10 fit in tapered pits 22 on the bottom surface of fixture 12. Tapered surfaces of tapered projections 24 abut the tapered surfaces of tapered pits 22 to precisely position fixture 12 relative to base 10.

It is not necessary for tapered projection 24 to completely fill the entire area of tapered pit 22. For example, the end of tapered projection 24 may be apart from the blind end of mating tapered pit 22, thus leaving a gap A1 therebetween.

as shown in FIG. 3. Tapered projections 24 and tapered pits 22 may be formed in other manners, as long as their tapered surfaces abut each other to achieve precision positioning of fixture 12.

The use of base 10 according to this embodiment will now be described. Pallet 14 is fixed to a machining apparatus (or a machine tool) using mount groove 14f. By abutting distance adjusting side plates L0 and L1, which are fixed to the neighboring sides of base 10, to the inside surfaces of edge locators 14b of pallet 14, and screwing bolts into screw holes N1 of base 10 via holes 14c of edge locators 14b, base 10 is positioned and retained to pallet 14.

Fastening bolts insert through holes 20a of base 10 and thread into T-slot nuts in T-slots 14a to firmly affix base 10 to pallet 14. Once base 10 is fixed to the top surface of pallet 14, there normally is no need to detach base 10 from the top surface of pallet 14.

Fixture 12 is mounted on mount surface 10a of base 10 so that tapered projections 24 of base 10 fit into tapered pits 22 on the bottom surface of fixture 12. Jigs 16 may be affixed to fixture 12 after fixture 12 is affixed to base 10. A workpiece 18 is fixed to fixture 12 using jigs 16.

Jigs 16 can be used to affix workpiece 18 to fixture 12 before fixture 12 is mounted on base 10, reducing the setup time required for changing fixtures 12. Such a preparatory setup improves the operation rate of the machining apparatus (or the machine tool).

Figure 4:
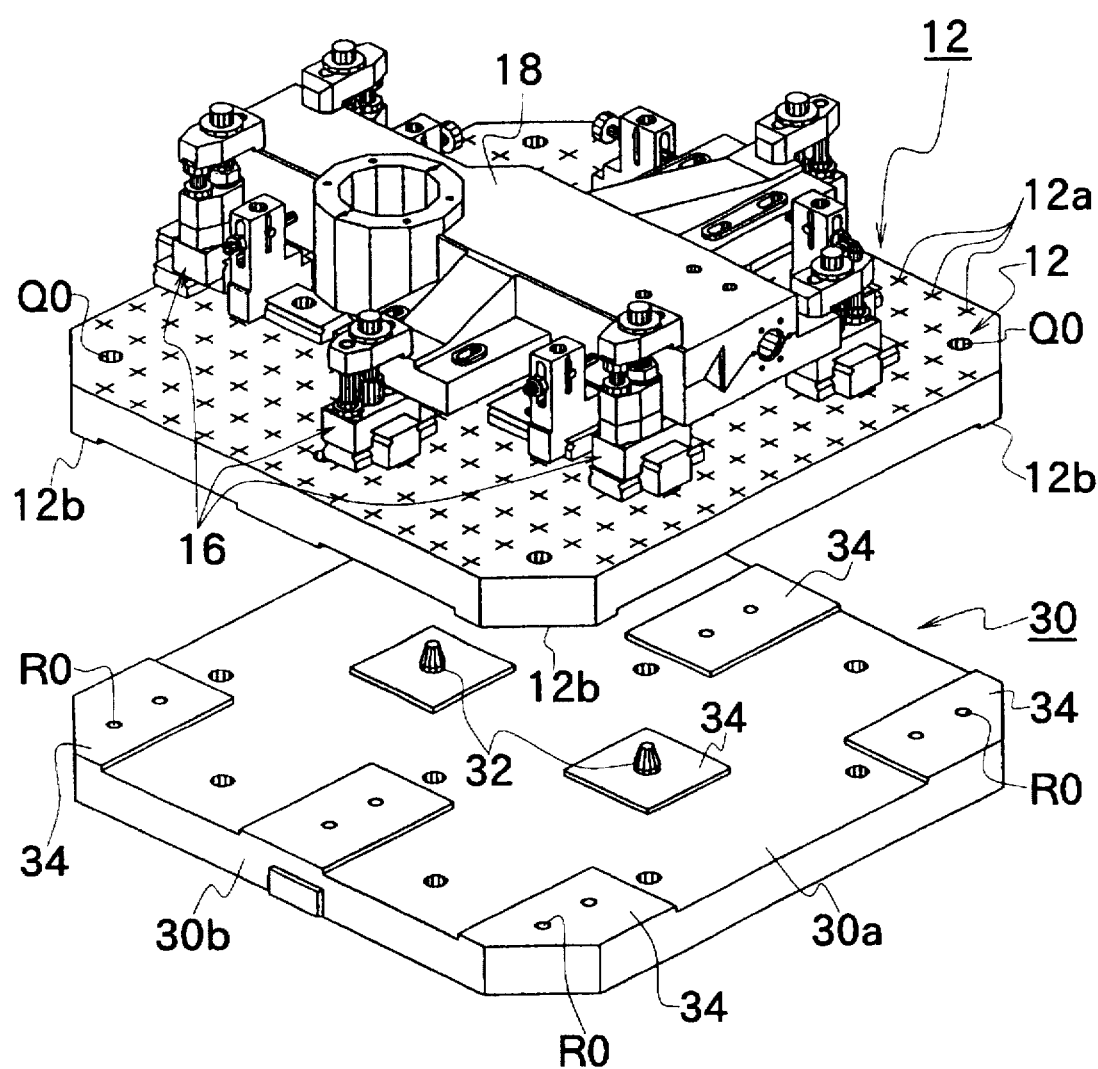
FIG. 4 is an exploded perspective view of a second embodiment of the base and the fixture of the present invention.

Referring to FIG. 4, a second embodiment of the present invention is shown with portions corresponding to the first embodiment denoted by the same reference numerals. In addition, the second embodiment includes a base 30 with a mount surface 30a and a base body 30b. Mount surface 30a further includes projecting contact surfaces 34. Tapered projections 32, which have a sectional tapering shape and become narrower toward their free ends, project from projecting contact surfaces 34 in a relatively central portion of mount surface 30a of base 30.

Projecting contact surfaces 34 are formed together with base body 30b. Fixture 12, according to this embodiment, has projecting contact surfaces 12b projecting from the bottom surface thereof for abutting projecting contact surfaces 34 of base 30, as in the first embodiment. The bottom of fixture 12 also has tapered pits for fitting over tapered projections 32 of base 30.

Tapered projections 32 are formed separately from base 30 and are affixed to base 30. As in the first embodiment, base 30 includes pits T1 bored into mount surface 30a of base 30. Pits T1 house tapered projections 32. Adhesive K1 holds taper pins G0 (see FIG. 3), which insert into each pit T1. Tapered projections 32 are thus affixed onto mount surface 30a of base body 30b.

Fixture 12 has pits T2 bored into a bottom surface of fixture 12. Adhesive K2 holds tapered bushes B0 (see FIG. 3), which insert into each pit T2. Tapered pits 22 are thus formed in the bottom surface of fixture 12.

Figure 5:
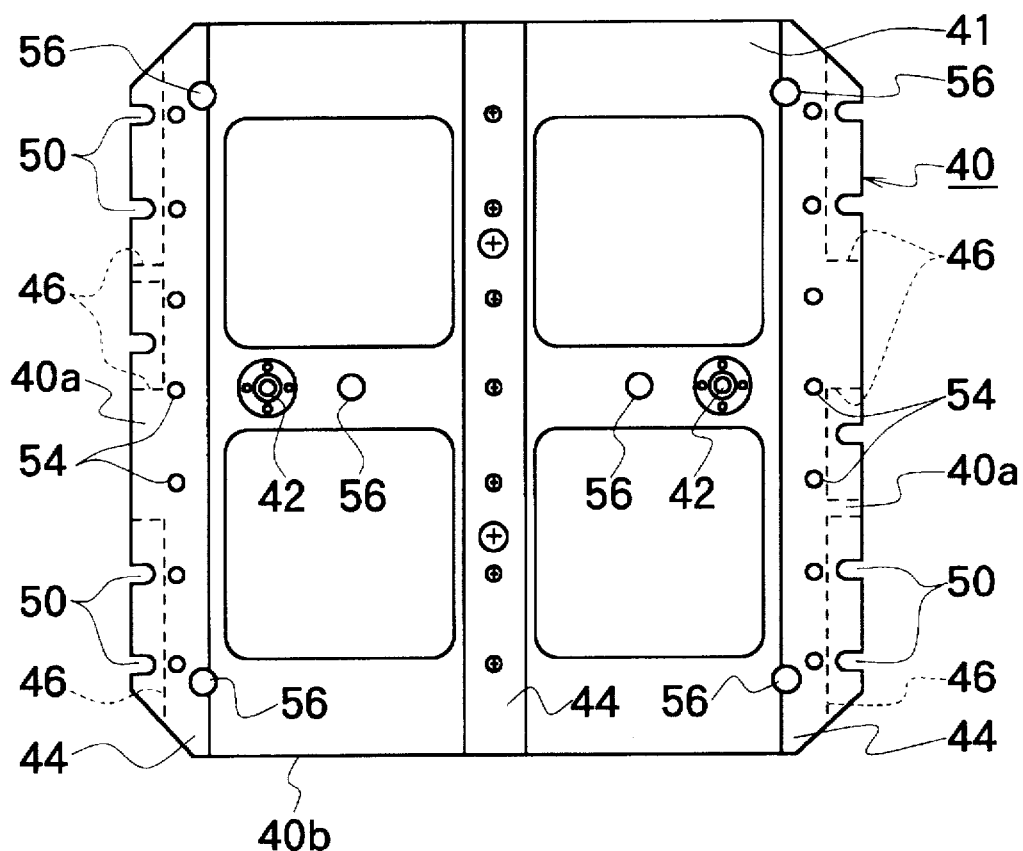
FIG. 5 is a plan view of a base according to a third embodiment of the invention.
Figure 6:
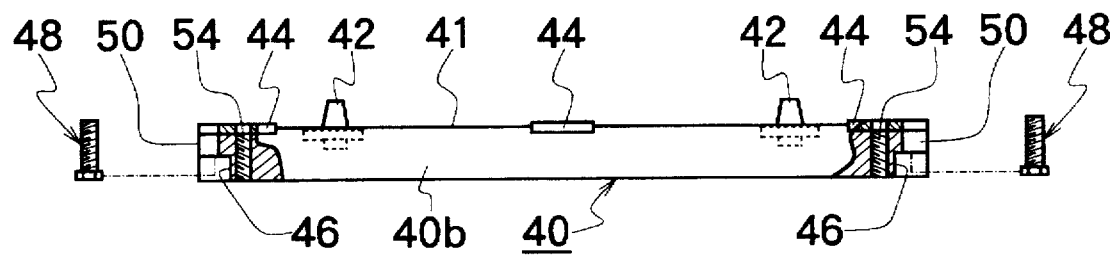
FIG. 6 is a partially cutaway side view of the base shown in FIG. 5.
Figure 7:
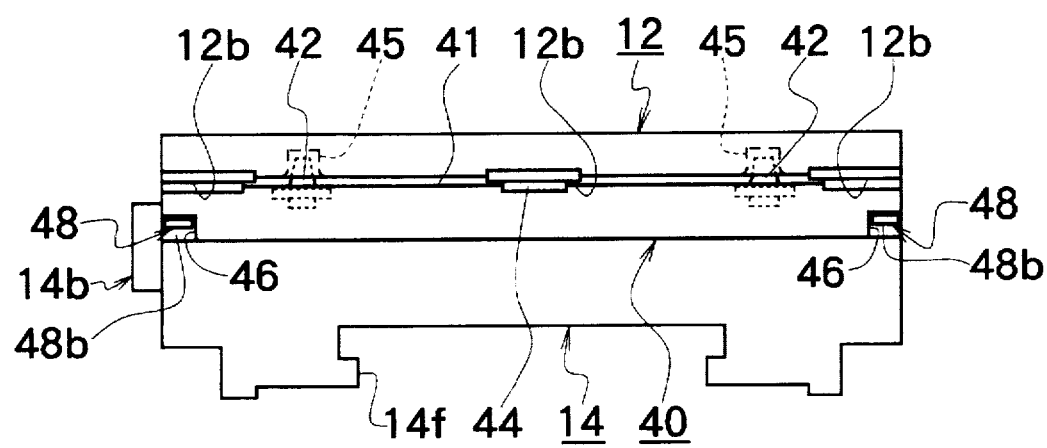
FIG. 7 is a side view of the base, that is attached to the fixture, also showing the pallet.

Referring to FIG. 5–7, a third embodiment of the present invention is shown with portions corresponding to the first embodiment denoted by the same reference numerals. In addition, the third embodiment includes a base 40 having a base body 40b with two side portions 40a on opposing sides of base body 40b. Three parallel projecting contact surfaces 44 extend across base body 40b. Two projecting contact surfaces 44 extend along side portions 40a respectively. The third projecting contact surface 44 extends along a central portion of base body 40b between side portions 40a. A plurality of tapered projections 42, having a sectional tapering shape and becoming narrower toward their free ends, are located on either side of the central portion of base body 40b, close to side portions 40a of a base 40. Two tapered projections 42 are located relatively close to the central portions of two projecting contact surfaces 44 extending along opposite side portions 40a, respectively.

As in the first embodiment, fixture 12 (see FIG. 7) includes projecting contact surfaces on its bottom surface that abut projecting contact surfaces 44 of base 40. Tapered pits 45, becoming narrower toward a blind end so that tapered pit 45 fits over corresponding tapered projection 42, engage tapered projections 42 when fixture 12 is affixed to base 40.

Base 40 further includes grooves 46 on its bottom surface. Grooves 46 extend along the bottom surface of base 40 beneath projecting contact surfaces 44 along both side portions 40a. Grooves 46 extend parallel to projecting contact surfaces 44, as shown in FIGS. 5 and 6. An outer edge of each side portion 40a includes a plurality of elongated openings 50 that open to corresponding groove 46 and to the outer edge. Elongated openings 50 receive fastening bolts 48 from the side.

Fastening bolts 48 thread into fixture 12 (not shown) from the bottom surface of base 40 to fasten fixture 12 to mount surface 41 of base 40. Without grooves 46 or elongated openings 50, fastening bolts 48 would have to be inserted into openings 50 before pallet 14 connects to the bottom of base 40. Grooves 46 and elongated openings 50 eliminate this problem by allowing insertion of fastening bolts 48 (see FIGS. 6, 7) into elongated openings 50 from the side after pallet 14 connects to base 40.

Each side portion 40a of base 40 includes a plurality of mount holes 54. Mount holes 54 receive bolts (not shown) from above, as shown in FIG. 5. Mount holes 54 affix fixture 12 to base 40. A plurality of holes 56 are bored in base 40, close to both side portions 40a of base 40 for mounting base 40 onto pallet 14. Base 40 affixes to the top of pallet 14 by inserting bolts (not shown) through holes 56 and threading the bolts into T-slot nuts which are held in T-slots 14a of pallet 14.

Figure 8:
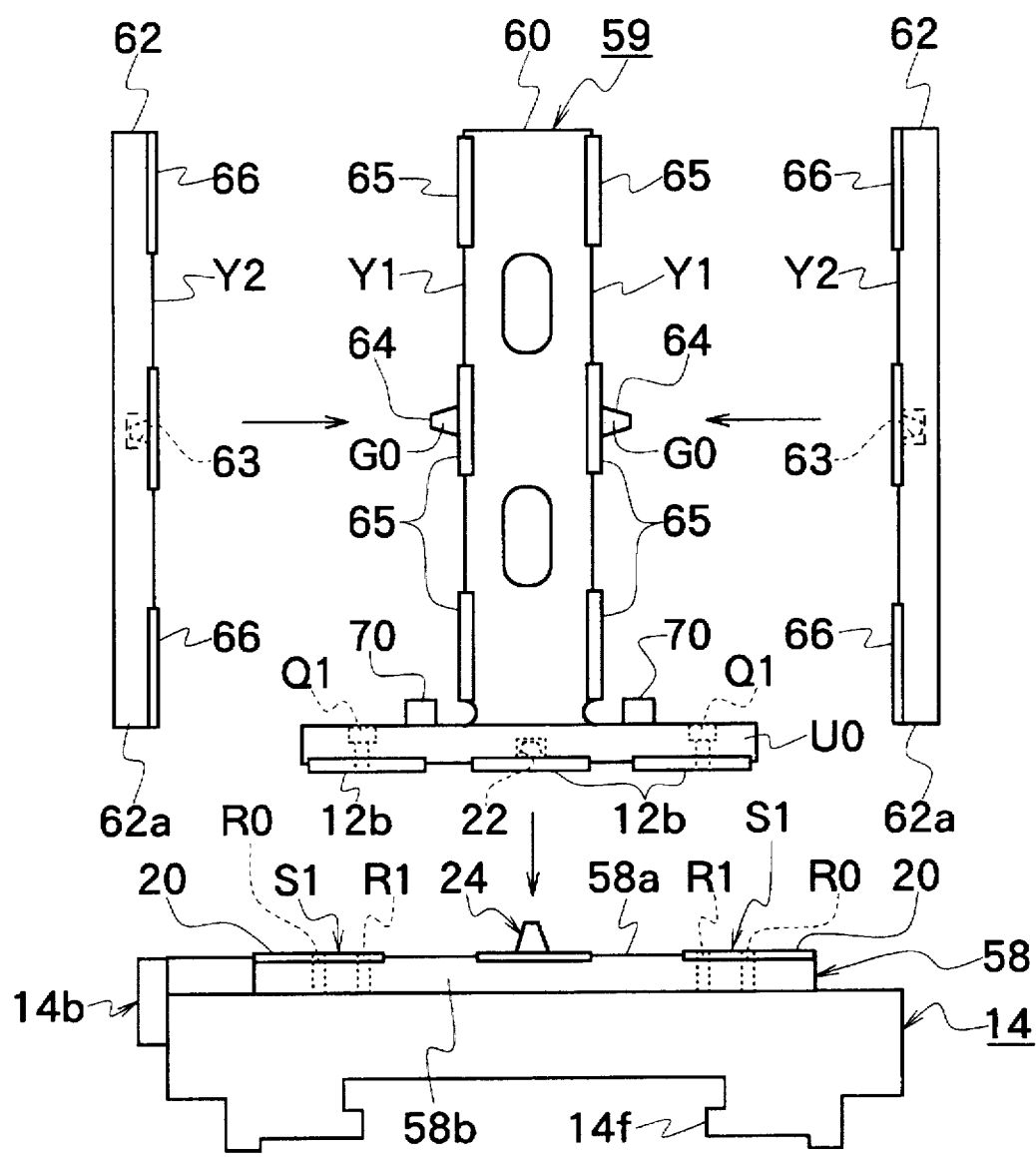
FIG. 8 is an exploded perspective view of a fourth embodiment of the base and the fixture to be fixed to the base of the present invention, also showing a pallet.

Referring to FIG. 8, a fourth embodiment of the present invention is shown with portions corresponding to the first embodiment denoted by the same reference numerals. Fixture 12 according to the first embodiment is of plate type. A fixture 59 of a two-sided block type affixes to a base 58 according to the fourth embodiment.

Base 58 includes a base body 58b with a mount surface 58a. Projecting contact surfaces 20 on mount surface 58a abut projecting contact surfaces 12b on the bottom of fixture 59. Tapered projections 24 fit into tapered pits 22 in the bottom of fixture 59. Each tapered pit 22 has a sectional tapering shape and becomes narrower toward its blind end. Each tapered projection 24 also has a sectional tapering shape and become narrower toward its free end.

Base body 58b of base 58 includes a screw hole R1 at each of four corners of base body 58b. Screw holes R1 are used to affix fixture 59 to base 58. Bolt holes R0 are used to affix fixture 12 to base body 58. Alternatively, screw holes may be designed so that they can be used for both fixture 12 (of the plate type) and fixture 59 (of the two-sided block type).

Fixture 59 includes a fixture body 60 having two opposing mount surfaces Y1. Two plates 62 each include a reverse side Y2 facing corresponding mount surface Y1 when plate 62 is affixed to fixture body 60. Projecting contact surfaces 65 on each mount surface Y1 abut a contact surface of reverse side Y2 of each plate 62. Tapered projections 64 fit into tapered pits 63 bored into reverse side Y2 of each plate 62. Each tapered pit 63 has a sectional tapered shape and becomes narrower toward its blind end. Each tapered projection 64 also has a sectional tapered shape and becomes narrower toward its free end.

Projecting contact surfaces 66 on reverse side Y2 of each plate 62 abut projecting contact surfaces 65 of fixture body 60. Thereby, when plate 62 is fixed to fixture body 60, plate 62 and fixture body 60 contact each other only at projecting contact surfaces 66 and 65. This reduced contact area requires precise cutting and grinding of the projecting contact surfaces 65 and 66 to level the contact surfaces and achieve stable and proper contact therebetween.

The contour of plates 62 and fixture body 60 is precisely defined such that projecting contact surfaces 66 of plates 62 contact only projecting contact surfaces 65 of fixture body 60. Projecting contact surfaces 65 and 66 facilitate the cleaning operation required prior to mounting plates 62 to fixture body 60. The stable and proper contact between plates 62 to fixture body 60, free from intervention of cutting chips or debris, can be achieved simply by cleaning projecting contact surfaces 65 and 66.

On the other hand, reverse side Y2 of each plate 62 may be entirely flat. That is, projecting contact surfaces 66 may be omitted from reverse side Y2 of each plate 62 without departing from the spirit and scope of this invention.

In FIG. 8, bolt insert holes Q1 receive bolts (not shown). Bolt insert holes Q1 correspond to screw holes R1 of base 58.

When plates 62 are mounted on mount surfaces Y1 of fixture body 60 with tapered projections 64 of fixture body 60 fitting into tapered pits 63 of plates 62, the tapered surfaces of tapered projections 64 abut the tapered surfaces of tapered pits 63 to precisely position plates 62 relative to fixture body 60.

Fixture body 60 additionally includes a base U0. Base U0 includes projections 70 below the area where plates 62 mount onto mount surfaces Y1. During mounting of plates 62 on mount surfaces Y1 of fixture body 60, lower ends 62a of plates 62 may be set on projections 70 on base U0 of fixture body 60.

As described above regarding the attaching operation, plates 62 can be detached from fixture body 60 at first and a workpiece 18 and jigs 16 (see FIGS. 1, 4) affixed to plates 62, prior to mounting of plates 62 to fixture body 60. Jigs 16 affix workpiece 18 to fixture 12 before fixture 12 is mounted on base 10, reducing the setup time required for changing fixtures 12. Such a preparatory setup improves the operating rate of the machining apparatus (or the machine tool).

Plates 62 can also be fixed directly to mount surface 58a of base 58 to use it as a plate type fixture. However, such construction is optional. In addition, although fixture body 60 and plates 62 of fixture 59 are shown as separate members according to FIG. 8, fixture body 60 and plates 62 may be manufactured from one piece.

Projecting contact surfaces 65 and/or tapered projections 64 may be manufactured either separately from fixture body 60 or from one piece with fixture body 60. Similarly, projecting contact surfaces 66 and/or tapered pits 63 may be manufactured separately from plate 62 or from one piece with plates 62.

Figure 9:
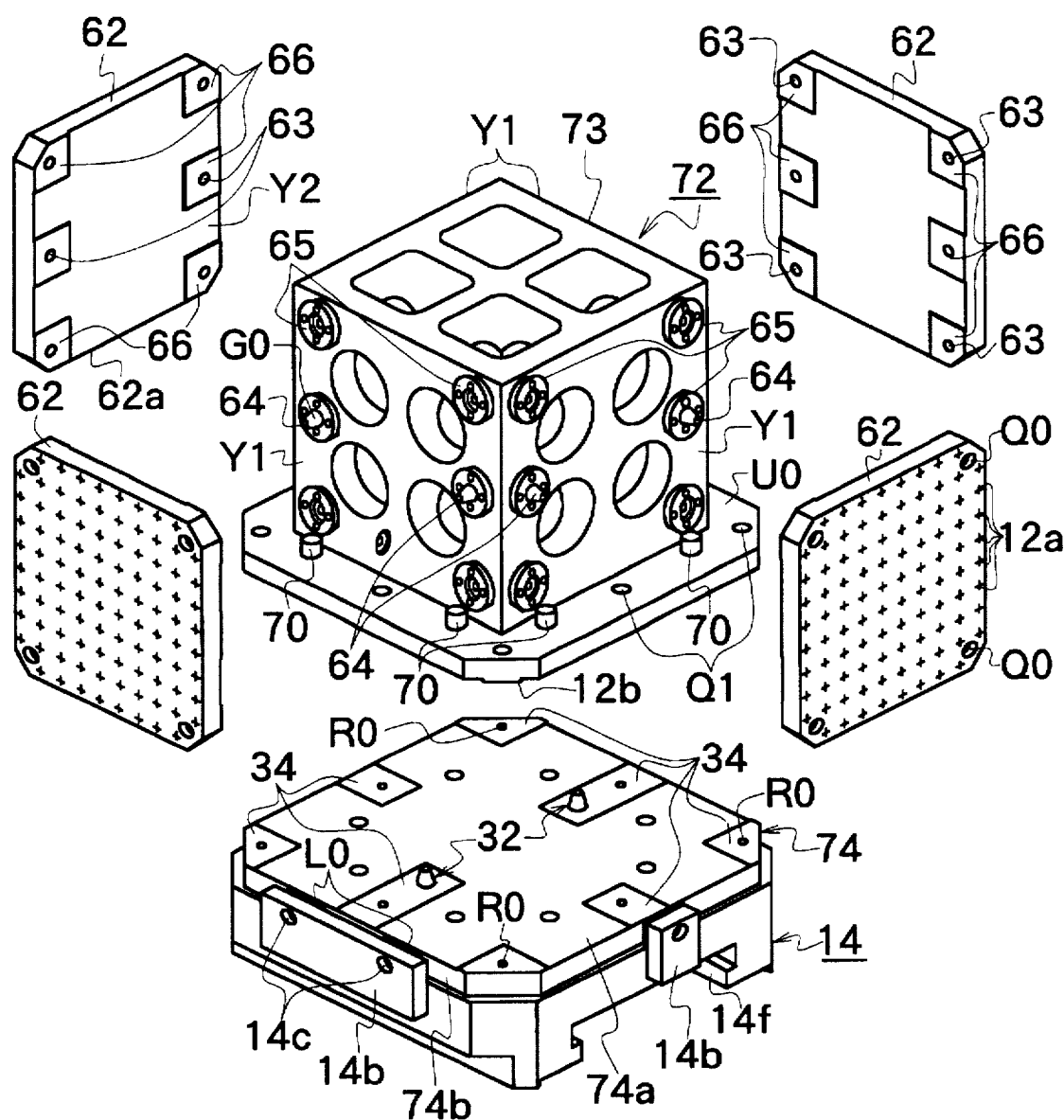
FIG. 9 is an exploded perspective view of a fifth embodiment of the base and the fixture to be fixed to the base of the present invention, also showing a pallet.

Referring to FIG. 9, a fifth embodiment of the present invention is shown with portions corresponding to the first embodiment denoted by the same reference numerals. A fixture 72 is a four-sided block having mount surfaces Y1 on each of four sides. A fixture body 73 of fixture 72 has base U0 at its bottom, as in the fourth embodiment described above. Base U0 has in its bottom surface projecting contact surfaces 12b and taper pits 22. Each of tapered pits 22 has a sectional tapering shape and becomes narrower toward its blind end (see FIG. 8). A base 74 has a mount surface 74a. Mount surface 74a includes projecting contact surfaces 34 formed together with a base body 74b of base 74, as in the second embodiment. Tapered projections 32 are formed separately from base body 74b and affixed thereto. Tapered projections 32 have a sectional tapered shape and become narrower toward their free end.

Projecting contact surfaces 34 on mount surface 74a of base 74 abut projecting contact surfaces 12b on the bottom surface of fixture 72. Tapered projections 32 fit into tapered pits 22 on the bottom surface of fixture 72.

Fixture 72 further includes four plates 62 which fixedly attach to fixture body 73. Each plate 62 has a reverse side Y2 facing corresponding mount surface Y1 of fixture body 73 when plate 62 is fixed to fixture body 73. As in the fourth embodiment, each mount surface Y1 includes projecting contact surfaces 65 abutting a contact surface of reverse side Y2 of each plate 62. In addition, tapered projections 64 fit into tapered pits 63 on reverse side Y2 of each plate 62. Each tapered pit 63 has a sectional tapered shape and becomes narrower toward its blind end.

Projecting contact surfaces 66 on reverse side Y2 of each plate 62 abut projecting contact surfaces 65 of fixture body 73, such that direct contact between plate 62 and fixture body 73 occurs only at projecting contact surfaces 65 and 66 thereof.

Referring now to FIGS. 8 and 9, tapered projections 64 and projecting contact surfaces 66 are separate and distinct pieces from fixture bodies 60 and 73. Each mount surface Y1 of fixture bodies 60 and 73 has pits for tapered projections 64. Tapered pins G0 housed in pits form tapered projections 64. Adhesive K1 affixes tapered pins G0 into the pits. Reverse side Y2 of each plate 62 also has pits for housing tapered pits 63. Tapered bushes B0 insert into the pits to form tapered pits 63. Adhesive K2 affixes tapered bushes B0 into the pits.

The present invention is not limited to the above described embodiments but can be modified in various manners. For example, the plate type fixture may have a shape of a disc, or other shape. The fixture may be of a type other than the plate, the two-sided block or the four-sided block. It could be a triangular type, a pyramid type or any other shaped fixture that can be used to hold a workpiece on a base.

In addition, the reference holes of the fixture may be located in predetermined locations instead of the matrix arrangement over the entire surface as shown in the figures. The reference holes may be replaced by reference slots having a sectional shape of, for example, a letter T. Furthermore, the reference holes or slots may be entirely omitted from the fixture.

Figure 10:
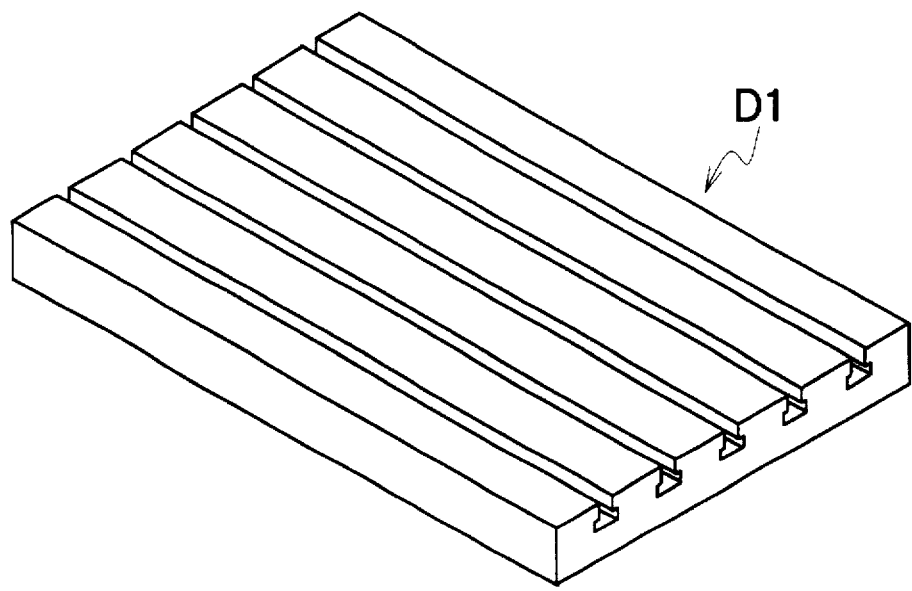
FIG. 10 is a perspective view showing a table of a machining apparatus.

The base of the present invention can be fixed to a device other than pallet 14 of a machine tool. For example, the base may be fixed to a table D1 of a machine tool as shown in FIG. 10.

Finally, tapered pins G0 forming tapered projections 24 and/or tapered bushes B0 forming tapered pits 22, as described in connection with the first embodiment, may be fixed in respective pits, T1 and T2, using various methods other than the use of adhesives K1 and K2. For example, tapered pins G0 and tapered bushes B0 may be threaded in pits T1 and T2. Such various fixing methods may also be used to form tapered pits 63 described in connection with all other embodiments.

What is claimed is:

1. A base, having a mount surface, for fixedly attaching a fixture for holding a workpiece onto said mount surface, comprising:

at least first and second plate members projecting from said mount surface;

at least first and second contact surfaces on an upper side of said first and second plate members parallel to said mounting surface;

a tapered projection on said mounting surface within a perimeter of said first contact surface, said tapered projection having a tapered outer surface narrowing toward a projection free end;

said fixture having a bottom surface;

at least third and fourth plate members projecting from said bottom surface;

at least third and fourth contact surfaces on a lower surface of said third and fourth plate members being parallel to said bottom surface;

said first and second contact surfaces alignable with said third and fourth contact surfaces, respectively;

a tapered pit on said bottom surface within an area of said third contact surface for receiving said tapered projection, said tapered pit having a tapered inner surface narrowing toward a pit inside end;

each of said second contact surface and said fourth contact surface including a hole;

said hole being shaped to receive a fastener which holds said second contact surface fixedly against said fourth contact surface, respectively; and said tapered outer surface of said tapered projection and said tapered inner surface of said tapered pit abuttingly engaging each other when said second contact surface is held fixedly against said fourth contact surface, whereby transverse movement between said fixture and said base is prevented.

2. The base of claim 1, wherein:

said base is attachable to a machining pallet having a top surface for receiving said base;

first and second position reference members are mounted along adjacent sides of said machining pallet, respectively;

said first and second position reference members projecting above said top surface;

side plates are mounted on adjacent sides of said base corresponding to said first and second position reference members;

said first and second reference members and said side plates include bolt holes;

said bolt holes receiving fasteners, said fasteners holding said side plates in a fixed position relative to said first and second position reference members, respectively, whereby said fixture, which is fixedly attached to said base, is firmly positioned on said machining pallet with reference to said first and second position reference members.

3. A fixture for holding a workpiece, fixedly mountable on a base, comprising:

said fixture having a bottom surface;

at least first and second plate members positioned on a mount surface of said base to contact at least third and fourth plate members on said bottom surface, respectively;

at least first and second contact surfaces on an upper side of said first and second plate members parallel to said mounting surface;

a tapered projection on said mounting surface within a perimeter of said first contact surface, said tapered projection having a tapered outer surface narrowing toward a projection free end;

at least third and fourth contact surfaces on a lower surface of said third and fourth plate members being parallel to said bottom surface;

said first and second contact surfaces alignable with said third and fourth contact surfaces, respectively;

a tapered pit on said bottom surface within an area of said third contact surface for receiving said tapered projection, said tapered pit having a tapered inner surface narrowing toward a pit inside end;

each of said second contact surface and said fourth contact surface including a hole;

said hole being shaped to receive a fastener which holds said second contact surface fixedly against said fourth contact surface, respectively;

said tapered outer surface of said tapered projection and said tapered inner surface of said tapered pit abuttingly engaging each other when said second contact surface is held fixedly against said fourth contact surface, whereby transverse movement between said fixture and said base is prevented.

4. The fixture of claim 3, wherein:

said base is attachable to a machining pallet having a top surface for receiving said base;

first and second position reference members are mounted along adjacent sides of said machining pallet, respectively;

said first and second position reference members projecting above said top surface;

side plates are mounted on adjacent sides of said base corresponding to said first and second position reference members;

said first and second reference members and said side plates include bolt holes;

said bolt holes receiving fasteners, said fasteners holding said side plates in a fixed position relative to said first and second position reference members, respectively, whereby said fixture, which is fixedly attached to said base, is firmly positioned on said machining pallet with reference to said first and second position reference members.

5. A machining device comprising:

a base having a mounting surface;

at least first and second plate members projecting from said mounting surface;

at least first and second contact surfaces on an upper side of said first and second plate members parallel to said mounting surface;

a tapered projection on said mounting surface within a perimeter of said first contact surface, said tapered projection having a tapered outer surface narrowing toward a projection free end;

a fixture for holding a workpiece, said fixture having a bottom surface;

at least third and fourth plate members projecting from said bottom surface;

at least third and fourth contact surfaces on a lower surface of said third and fourth plate members being parallel to said bottom surface;

said first and second contact surfaces alignable with said third and fourth contact surfaces, respectively;

a tapered pit on said bottom surface within an area of said third contact surface for receiving said tapered projection, said tapered pit having a tapered inner surface narrowing toward a pit inside end;

each of said second contact surface and said fourth contact surface including a hole;

said hole being shaped to receive a fastener which holds said second contact surface fixedly against said fourth contact surface, respectively;

said tapered outer surface of said tapered projection and said tapered inner surface of said tapered pit abuttingly engaging each other when said second contact surface is held fixedly against said fourth contact surface, whereby transverse movement between said fixture and said base is prevented.

6. The machining device of claim 5, further including:

a machining pallet having a top surface for receiving said base;

first and second position reference members mounted along adjacent sides of said machining pallet, respectively;

said first and second position reference members projecting above said top surface;

side plates mounted on adjacent sides of said base corresponding to said first and second position reference members;

said first and second reference members and said side plates including bolt holes;

said bolt holes receiving fasteners, said fasteners holding said side plates in a fixed position relative to said first and second position reference members, respectively, whereby said fixture, which is fixedly attached to said base, is firmly positioned on said machining pallet with reference to said first and second position reference members.

7. The machining device of claim 5, wherein:

said fixture includes at least one separate mounting device, attachable to a device mounting surface of said fixture;

at least fifth and sixth plate members projecting from said device mounting surface;

at least fifth and sixth contact surfaces on an outer side of said fifth and sixth plate members parallel to said device mounting surface;

a tapered projection on said device mounting surface within a perimeter of said fifth contact surface, said tapered projection having a tapered outer surface narrowing toward a projection free end;

said separate mounting device having a separate mounting device bottom surface;

at least seventh and eighth plate members projecting from said separate mounting device bottom surface;

at least seventh and eighth contact surfaces on an outer surface of said seventh and eighth plate members being parallel to said separate mounting device bottom surface;

said fifth and sixth contact surfaces alignable with said seventh and eighth contact surfaces, respectively;

a tapered pit on said separate mounting device bottom surface within an area of said seventh contact surface for receiving said tapered projection, said tapered pit having a tapered inner surface narrowing toward a pit inside end;

each of said sixth contact surface and said eighth contact surface including a hole;

said hole being shaped to receive a fastener which holds said sixth contact surface fixedly against said eighth contact surface, respectively;

said tapered outer surface of said tapered projection and said tapered inner surface of said tapered pit abuttingly engaging each other when said sixth contact surface is held fixedly against said eighth contact surface, whereby transverse movement between said separate mounting device and said fixture is prevented.

8. The machining device of claim 7, wherein said fifth and sixth plate members and said seventh and eighth plate members are integral parts of said separate mounting device and said fixture.

9. The machining device of claim 7, wherein said fifth and sixth plate members and said seventh and eighth plate members are separate and distinct from said separate mounting device and said fixture and are fixedly attached to said separate mounting device and said fixture, respectively.

10. The machining device as in claim 5, wherein said at least first and second plate members and said at least third and fourth plate members are an integral part of said base and said fixture, respectively.

11. The machining device as in claim 5, wherein said at least first and second plate members and said at least third and fourth plate members are separate and distinct from said base and said fixture and are fixedly attached to said base and said fixture respectively.

12. The machining device as in claim 5, wherein:

said tapered projection fits tightly into said tapered pit such that said base and said fixture are precisely aligned when said fixture is fixedly attached to said base.

13. The machining device as in claim 12, wherein:

said tapered projection includes a first pit bored into said mounting surface of said base and a tapered pin inserted and fixed into said first pit; and said tapered pit includes a second pit bored into said bottom surface of said fixture and a tapered bush inserted and fixed into said second pit.

14. The machining device as in claim 5, wherein said fixture includes one of a planar mounting device, a two-sided block, and a four-sided block.

* * * * *